(12) United States Patent
Chang

(10) Patent No.: US 12,032,503 B2
(45) Date of Patent: Jul. 9, 2024

(54) ELECTRONIC APPARATUS AND SIGNAL SWITCHING METHOD

(71) Applicant: GETAC HOLDINGS CORPORATION, Taoyuan (TW)

(72) Inventor: Chin-Jung Chang, Taipei (TW)

(73) Assignee: Getac Holdings Corporation, Taoyuan (TW)

( * ) Notice: Subject to any disclaimer, the term of this patent is extended or adjusted under 35 U.S.C. 154(b) by 181 days.

(21) Appl. No.: 17/359,355

(22) Filed: Jun. 25, 2021

(65) Prior Publication Data

US 2022/0206984 A1    Jun. 30, 2022

(30) Foreign Application Priority Data

Dec. 25, 2020  (CN) .......................... 202011565087.9

(51) Int. Cl.
*G06F 13/40* (2006.01)
*G06F 1/18* (2006.01)

(52) U.S. Cl.
CPC .......... *G06F 13/4068* (2013.01); *G06F 1/189* (2013.01)

(58) Field of Classification Search
CPC ............. G06F 13/4022; G06F 13/4282; G06F 2213/0042; G06F 13/20; G06F 1/3253; G06F 13/4068; G06F 13/4265; G06F 1/189; G06F 1/1616; G06F 1/1654; G06F 1/1669; G06F 1/1683; G06F 1/266
USPC .......................... 370/362; 710/110, 316, 315
See application file for complete search history.

(56) References Cited

U.S. PATENT DOCUMENTS

| | | | |
|---|---|---|---|
| 9,804,650 B2 * | 10/2017 | Patil ....................... G06F 1/3253 |
| 11,487,687 B2 * | 11/2022 | Mutter ................ H04L 25/0264 |
| 2003/0105910 A1 * | 6/2003 | Noonan .............. G06F 13/4027 |
| | | | 710/306 |
| 2007/0082634 A1 * | 4/2007 | Thijssen .............. H04B 1/3833 |
| | | | 455/169.1 |
| 2010/0109749 A1 * | 5/2010 | Chen ..................... G06F 13/385 |
| | | | 327/365 |
| 2014/0006678 A1 * | 1/2014 | Lai ......................... G06F 13/385 |
| | | | 710/316 |
| 2015/0012682 A1 * | 1/2015 | Yang ....................... G09G 5/006 |
| | | | 710/316 |
| 2017/0126041 A1 * | 5/2017 | Sato .......................... H02J 7/02 |
| 2018/0060201 A1 * | 3/2018 | Newberry ............. G06F 13/385 |
| 2018/0341310 A1 * | 11/2018 | Lambert ............. G06F 13/4282 |
| 2019/0303332 A1 * | 10/2019 | Yamada ............. G06F 13/4282 |
| 2021/0123986 A1 * | 4/2021 | Kagaya ............... G06F 13/4282 |

FOREIGN PATENT DOCUMENTS

CN           101739374 A        6/2010

\* cited by examiner

*Primary Examiner* — Faisal M Zaman
(74) *Attorney, Agent, or Firm* — Cooper Legal Group, LLC (57) ABSTRACT

A signal switching method applicable to a first electronic device includes: receiving a voltage of a second electronic device through a power supply contact pin of the first electronic device; comparing the voltage with a threshold; when the voltage is greater than the threshold, connecting a first bus of the first electronic device to at least one signal contact pin, and disconnecting a second bus of the first electronic device from the at least one signal contact pin; and when the voltage is not greater than the threshold, connecting the second bus to the at least one signal pin, and disconnecting the first bus from the at least one signal contact pin.

8 Claims, 8 Drawing Sheets

ELECTRONIC APPARATUS AND SIGNAL SWITCHING METHOD

CROSS-REFERENCE TO RELATED APPLICATIONS

The present application claims priority to a CN Patent Application No. 202011565087.9, filed on Dec. 25, 2020, the disclosure of which is hereby incorporated by reference herein in its entirety.

BACKGROUND OF THE INVENTION

Field of the Invention

The present invention relates to an electronic apparatus and a signal switching method.

Description of the Prior Art

Accompanied by rapid development in computing and communication technologies, tablet computers have gradually become one common electronic device in numerous applications in commercial, learning and recreational fields. Most peripheral devices (e.g., optical disc drives and keyboards) are omitted from tablet computers in order to provide users with easy portability and operation convenience in various operating environments. However, as being restricted by design requirements for being light in weight and small and thin in size, functions of tablet computers are no comparison to those of desktop computers having greater application spaces. Thus, diversified accessory devices (e.g., optical disc drives, keyboards, digital drawing pads, hard disc drives and charging docks) have been developed for users to assemble with tablet computers when needed.

A tablet computer and an accessory device are mutually connected by mutually matching connectors provided on the two, further a providing communication channel for transmitting various signals (e.g., power and data) between the two. A connector includes multiple contact pins. When two mutually matching connectors are plugged with each other, the contact pins thereon come into contact and are adhered to one another so as to establish an electrical connection. Conventionally, according to communication protocols (e.g., USB 2.0, USB 3.0, FireWire, UART and $I^2C$) supported by connectors, each contact pin of the connectors is designated to send signals of a certain type. Thus, the number of connectors needed (i.e., the number of contact pins) increases or decreases along with the number of communication protocols adopted, further affecting the overall dimensions of tablet computers.

SUMMARY OF THE INVENTION

An electronic apparatus according to an embodiment includes a first electronic device. The first electronic device includes a first power supply contact pin, at least one first signal contact pin, a comparison circuit, a first control circuit, a first bus, a second bus and a first multiplexer. The first control circuit has a first input/output interface and a second input/output interface. One terminal of the first bus is coupled to the first input/output interface, and one terminal of the second bus is coupled to the second input/output interface. The first multiplexer is coupled to the at least one first signal contact pin, the other terminal of the first bus and the other terminal of the second bus. Herein, the first power supply contact pin receives a supply voltage from outside the first electronic device. The comparison circuit compares the supply voltage with a threshold and accordingly generates a comparison result. The first multiplexer selects and connects one between the first bus and the second bus to the at least one first signal contact pin according to the comparison result.

A signal switching method according to an embodiment, applicable to a first electronic device, includes: receiving a voltage from a second electronic device through a power supply contact pin of the first electronic device; comparing the voltage with a threshold; when the voltage is greater than the threshold, connecting a first bus of the first electronic device to at least one signal contact pin, and disconnecting a second bus of the first electronic device from the at least one signal contact pin; and when the voltage is not greater than the threshold, connecting the second bus to the at least one signal contact pin, and disconnecting the first bus from the at least one signal contact pin.

In conclusion of the above, the electronic apparatus and the signal switching method according to any one of the embodiments are capable of switching, according to an external supply voltage, an input/output interface used by a first control unit, so that two electronic devices can be connected using a minimal number of pins, and one electronic device in a stopped state (e.g., being in a period in which a control unit does not operate normally such as currently executing a boot procedure or standing-by) is allowed to communicate with the other electronic device connected thereto.

DETAILED DESCRIPTION OF THE EMBODIMENTS

The terms "first', "second", "third" and "fourth" used in the literature are for distinguishing elements referred to, and are not to be construed as sorting or limiting differences of the elements, or as limiting the scope of the present invention.

Figure 1:
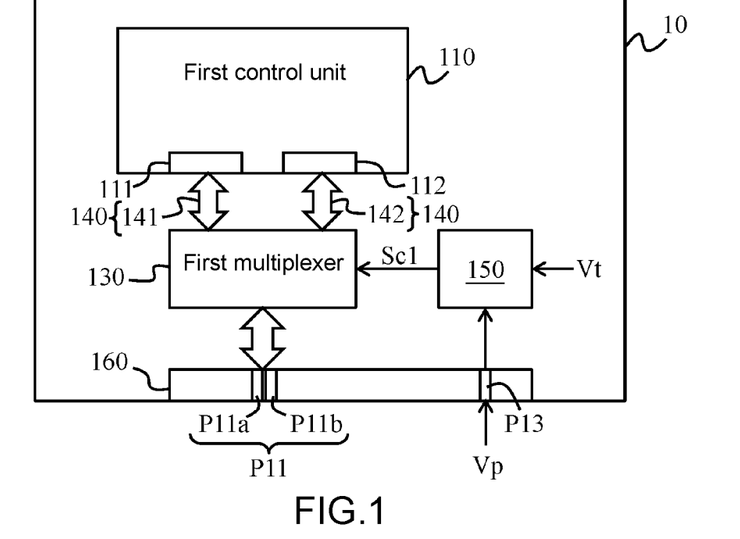
FIG. 1 is a functional block diagram of an electronic apparatus according to an embodiment.

Referring to FIG. 1, an electronic apparatus includes an electronic device 10 (to be referred to as a first electronic device 10). The first electronic device 10 includes a first control circuit, a multiplexer (to be referred to as a first multiplexer 130), multiple buses 140, at least one signal contact pin (to be referred to as a first signal contact pin P11, e.g., P11a and P11b), a power supply contact pin (to be referred to as a first power supply contact pin P13) and a comparison circuit 150. The first control circuit includes a control unit (to be referred to as a first control unit 110).

The first control unit 110 has multiple input/output interfaces 111 and 112, and the input/output interfaces 111 and 112 share at least one first signal contact pin P11. In other words, the input/output interface 111 and 112 are individually connected to the first multiplexer 130 through one bus 140, and the first multiplexer 130 is further coupled to the at least one first signal contact pin P11. The comparison circuit 150 is coupled to the first power supply contact pin P13 and the first multiplexer 130. The number of the buses 140 is substantially the same as the number of the input/output interfaces 111 and 112.

Assuming that the number of the input/output interfaces 111 and 112 (to be referred to as a first input/output interface 111 and a second input/output interface 112) sharing the first signal contact pin P11 is two, the multiple buses 140 may include a first bus 141 and a second bus 142. One terminal of the first bus 141 is coupled to the first input/output interface 111, and the other terminal of the first bus 141 is coupled to the first terminal of the first multiplexer 130. One terminal of the second bus 142 is coupled to the second input/output interface 112, and the other terminal of the second bus 142 is coupled to the second terminal of the first multiplexer 130. The third terminal of the first multiplexer 130 is coupled to the first signal contact pin P11. The comparison circuit 150 is coupled between the first power supply pin P13 and the control terminal of the first multiplexer 130.

Figure 2:
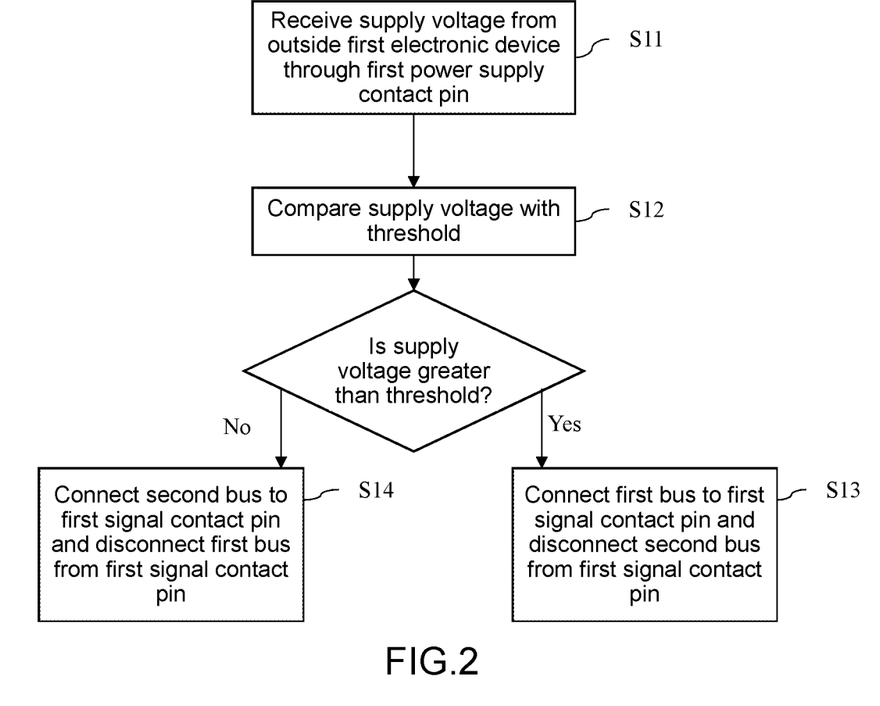
FIG. 2 is a flowchart of a signal switching method according to an embodiment.

Referring to FIG. 1 and FIG. 2, the first power supply contact pin P13 is configured to receive a voltage (to be referred to as a supply voltage Vp) from outside the first electronic device 10 (step S11). The comparison circuit 150 compares the supply voltage Vp with a threshold Vt (step S12) and accordingly generates a comparison result Sc1. The first multiplexer 130 selects and connects one between the first bus 141 and the second bus 142 to the first signal contact pin P11 according to the comparison result Sc1, as shown in FIG. 3 to FIG. 6.

In some embodiments, the number of the at least one first signal contact pin P11 may be one or more.

Figure 3:
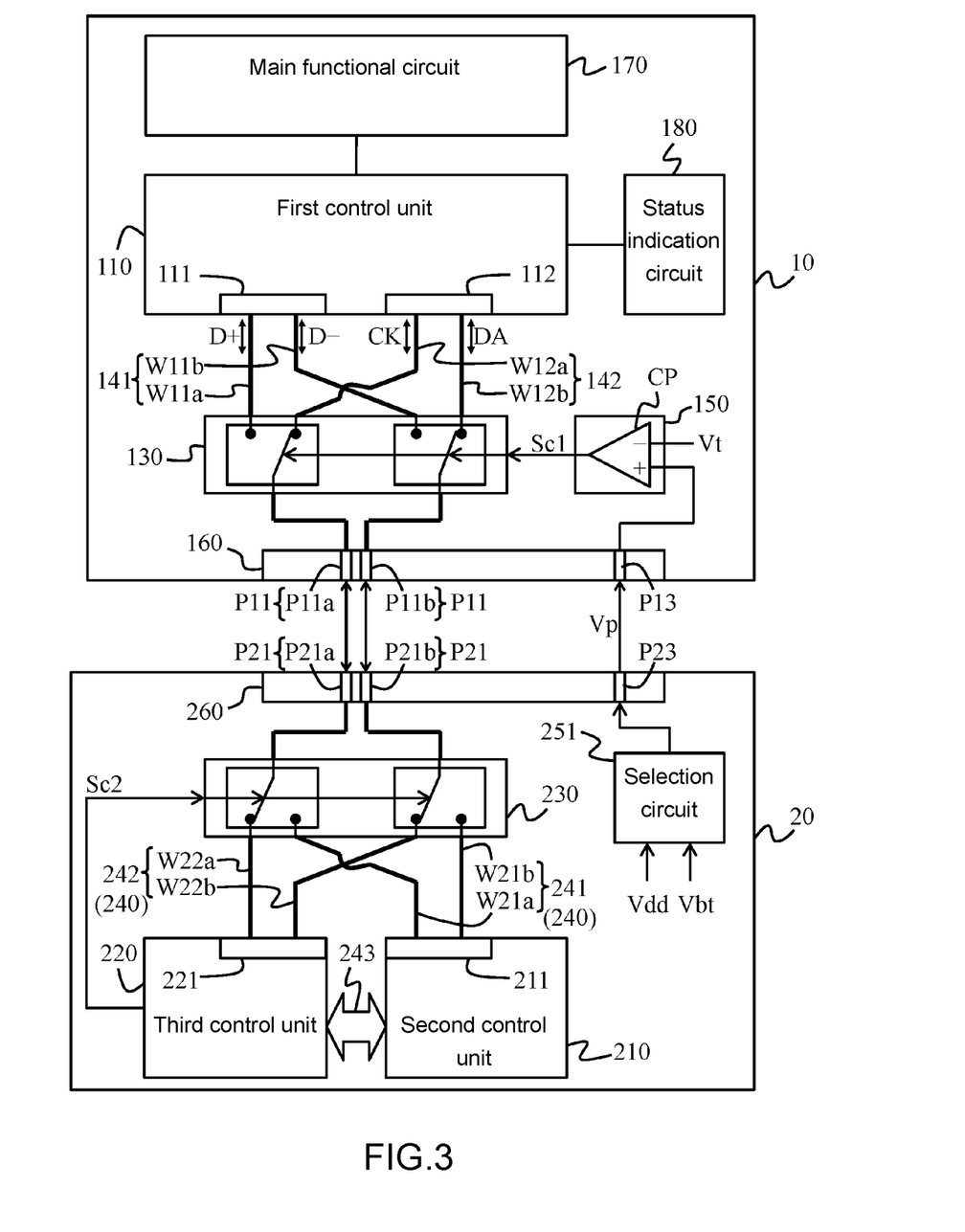
FIG. 3 and FIG. 4 are functional block diagrams of an electronic apparatus according to another embodiment.
Figure 4:
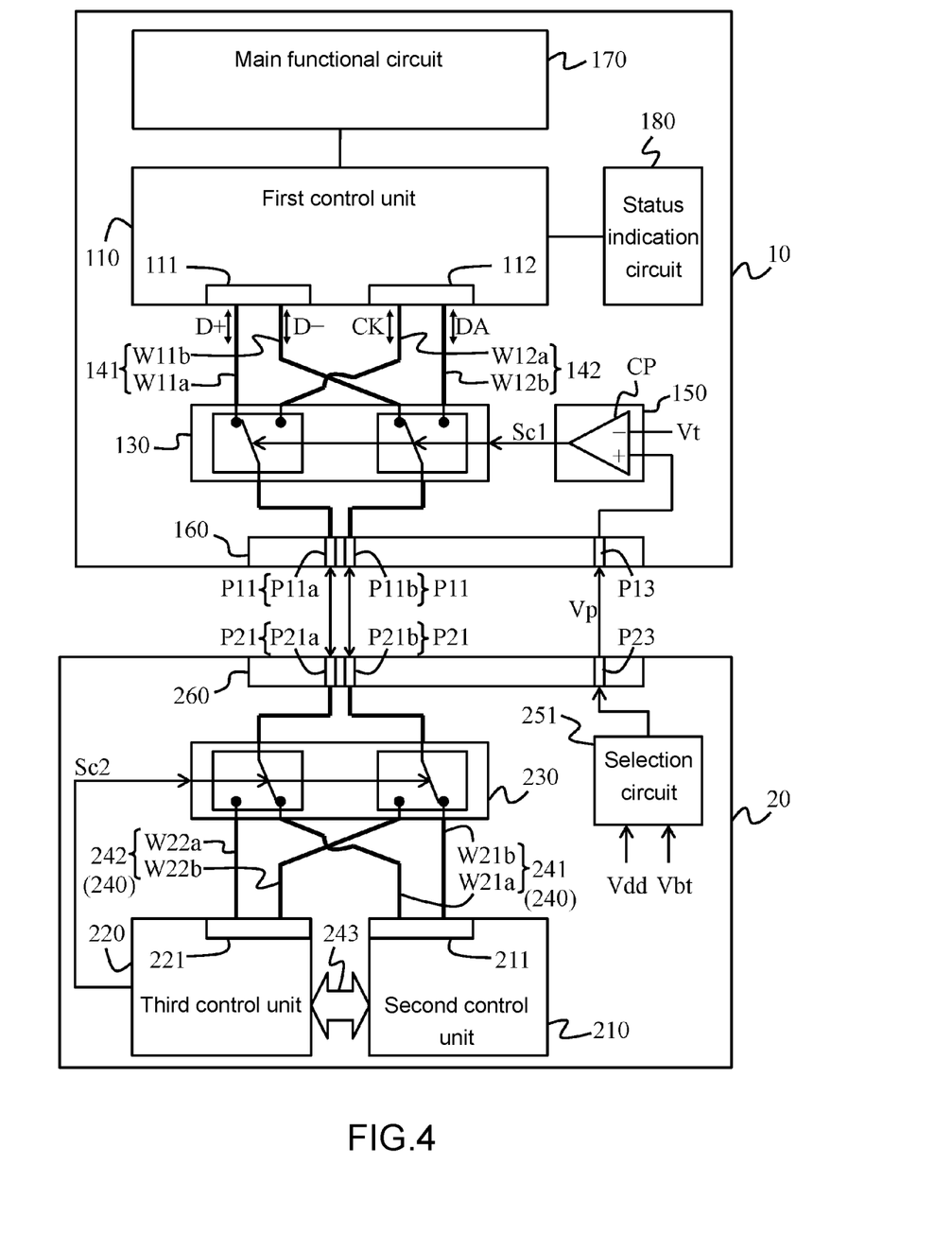
Figure 5:
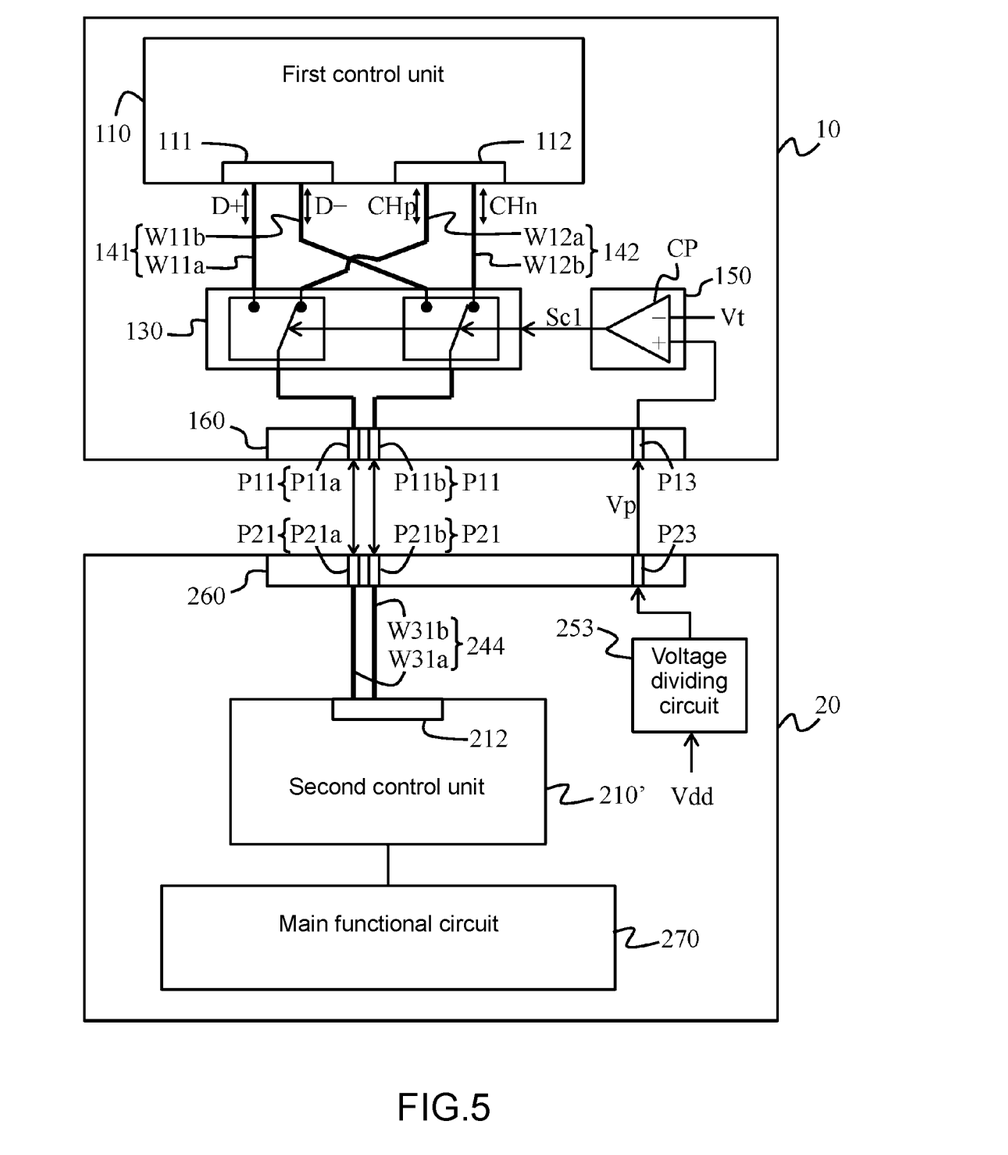
FIG. 5 and FIG. 6 are functional block diagrams of an electronic apparatus according to yet another embodiment.
Figure 6:
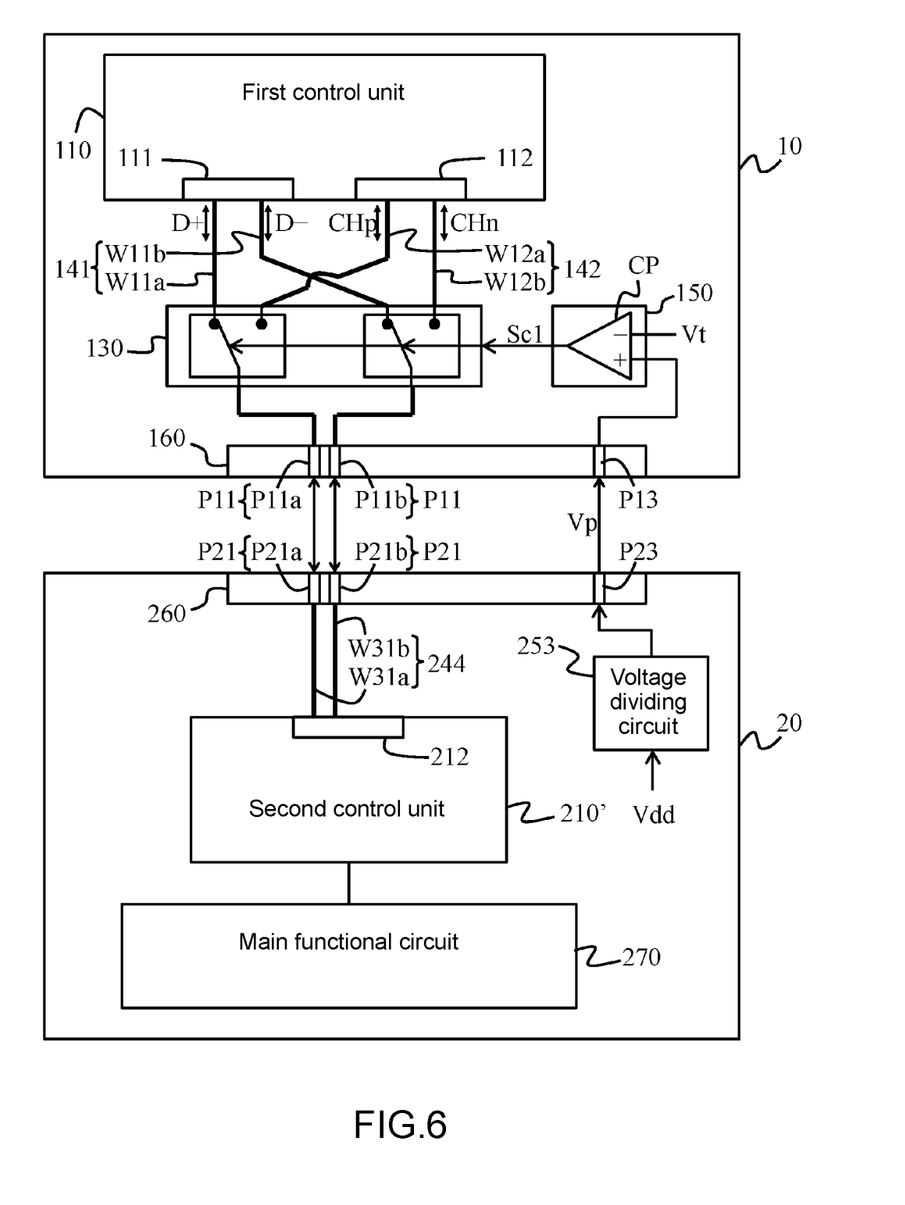

For example, assume that the number of the at least one first signal contact pin P11 is two (i.e., two first signal contact pins P11a and P11b). When the supply voltage Vp is greater than the threshold Vt, the first multiplexer 130 connects the first bus 141 to at least one first signal contact pin P11 (step S13), i.e., connecting multiple transmission wires W11a and W11b of the first bus 141 to the two first signal contact pins P11a and P11b, as shown in FIG. 4 and FIG. 6. Meanwhile, the first multiplexer 130 disconnects the second bus 142 from the at least one first signal contact pin P11 (step S13), i.e., disconnecting multiple transmission wires W12a and w12b of the second bus 142 from the first signal contact pins P11a and P11b, as shown in FIG. 4 and FIG. 6. Conversely, when the supply voltage Vp is not greater than (e.g., smaller than) the threshold voltage Vt, the first multiplexer 130 connects the second bus 142 to the at least one first signal contact pin P11 (step S14), i.e., connecting the multiple transmission wires W12a and W12b of the second bus 142 to the two first signal contact pins P11a and P11b, as shown in FIG. 3 and FIG. 5. Meanwhile, the first multiplexer 130 disconnects the first bus 141 from the at least one first signal contact pin P11 (step S14), i.e., disconnecting the multiple transmission wires W11a and W11b of the first bus 141 from the two first signal contact pins P11a and P11b, as shown in FIG. 3 and FIG. 5.

It can be understood that, although the input/output interfaces 111 and 112 located on the same control unit are given in the description of the foregoing embodiment, such configuration is not a limitation to the present invention. In other words, according to actual requirements, the input/output interfaces 111 and 112 may also be included in different control units (not shown). When the input/output interfaces 111 and 112 are included in different control units, the control units including the input/output interfaces 111 and 112 may have an additional communication channel therebetween.

In some embodiments, the input/output interfaces 111 and 112 sharing the at least one first signal contact pin P11 may adopt different communication protocols, and so the buses 140 coupled with the input/output interfaces 111 and 112 also support different communication protocols. For example, the two input/output interfaces 111 and 112 adopt different communication protocols, and so the first bus 141 and the second bus 142 also support different communication protocols. The first input/output interface 111 and the first bus 141 coupled thereto support the same communication protocol, and the second input/output interface 112 and the second bus 142 coupled thereto support another same communication protocol.

In some embodiments, the communication protocol adopted by each of the input/output interfaces 111 and 112 may be Universal Serial Bus (USB), FireWire (generally referring to IEEE 1394-2006, Universal Asynchronous Receiver/Transmitter (UART), Inter-Integrated Circuit ($I^2C$), DisplayPort (DP), Serial Peripheral Interface (SPI), System Management Bus (SMBus), Inter-IC Sound or Integrated Interchip Sound ($I^2S$), or Peripheral Component Interconnect (PCI). Wherein, USB may be USB 2.0 (standard pinout), USB 3.0 (standard pinout), mini USB or micro USB.

In some embodiments, the number of the first signal contact pin P11 shared by the input/output interfaces 111 and 112 may be one or more. In other words, each of the input/output interfaces 111 and 112 may have a certain number of pins to share a certain number of first signal contact pins P11 through the first multiplexer 130. That is, each of the two communication protocols adopted by the input/output interfaces 111 and 112 has a certain number of defined signals that share a certain number of first signal contact pins P11 through the first multiplexer 130. Similarly, a certain number of transmission wires W11a and W11b of the first bus 141 coupled with the first input/output interface 111 and a certain number of transmission wires W12a and W12b of the second bus 142 coupled with the second input/output interface 112 are respectively electrically connected to a certain number of first signal contact pins P11 through the first multiplexer 130. The certain number may be one, two, three, four or more. In one example, the input/output interfaces 111 and 112 may share by part of the pins thereof the at least one first signal contact pin P11. In another embodiment, the input/output interfaces 111 and 112 may share by all the pins thereof the at least one first signal contact pin P11. In another example, between the input/output interfaces 111 and 112, all the pins of one and part of the pins of the other share the at least one first signal contact pin P11.

For example, assume that the communication protocol adopted by the first input/output interface 111 is USB 2.0 (standard pinout) and the communication protocol adopted by the second input/output interface 112 is USB 3.0 (standard pinout); that is, the first input/output interface 111 has two pins respectively transmitting two defined signals (i.e., a differential data pair), and the second input/output interface 112 has six pins respectively transmitting six defined signals (i.e., a differential data pair, a differential receiver pair, and a differential transmitter pair). Herein, the two pins in the first input/output interface 111 for transmitting two defined signals (i.e., the differential data pair) and the two pins in the second input/output interface 112 for transmitting two defined signals (i.e., the differential data pair) may share two first signal contact pins P11a and P11b. In another example, assume that the communication protocol adopted by the first input/output interface 111 is USB 2.0 (standard pinout) and the communication protocol adopted by the second input/output interface 112 is I²C; that is, the first input/output interface 111 has two pins respectively transmitting two defined signals (i.e., the differential data pair), and the second input/output interface 112 has two pins respectively transmitting two defined signals (i.e., clock and data). Herein, the pin in the first input/output interface 111 for transmitting positive data and the pin in the second input/output interface 112 for transmitting clock may share one first signal contact pin P11a, and the pin in the first input/output interface 111 for transmitting negative data and the pin in the second input/output interface 112 for transmitting data may share the other first signal contact pin P11b.

In some embodiments, referring to FIG. 3 to FIG. 6, the comparison circuit 150 includes a comparator CP. The positive terminal of the comparator CP is coupled to the first power supply contact pin P13, and the negative terminal of the comparator CP is coupled to the threshold. The output terminal of the comparator CP is coupled to the control terminal of the first multiplexer 130.

In some embodiments, referring to FIG. 3 to FIG. 6, the electronic apparatus further includes another electronic device 20 (to be referred to as a second electronic device 20). Further, the supply voltage Vp may be outputted from the second electronic device 20 to the first electronic device 10. Herein, the first electronic device 10 and the second electronic device 20 may be detachably assembled together. In some embodiments, the first electronic device 10 and the second electronic device 20 may be a tablet computer and an accessory device thereof. In one example, the first electronic device 10 is a tablet computer, and the second electronic device 20 is an accessory device. In another example, the first electronic device 10 may be an accessory device, and the second electronic device 10 may be a tablet computer. The accessory device may be a peripheral input device or a charging dock. The peripheral input device may, for example, a keyboard, a touchpad, a display screen, a projection device, a speaker, an optical disc drive, a digital drawing pad, a hard disc drive or any combination thereof.

In some embodiments, referring to FIG. 3 and FIG. 4, the second electronic device 20 may output the supply voltage Vp within different voltage ranges to the first electronic device 10 according to the system status thereof, so that the first electronic device 10 and the second electronic device 20 can communicate using an appropriate protocol according to the system status of the second electronic device 20.

In one embodiment, the second electronic device 20 may include a second control circuit, a multiplexer (to be referred to as a second multiplexer 230), multiple buses 240, at least one signal contact pin (to be referred to as a second signal contact pin P21, e.g., P21a and P21b), a power supply contact pin (to be referred to as a second power supply contact pin P23), and a selection circuit 251. The second control circuit includes two control units (to be referred to as a second control unit 210 and a third control unit 220). The number of the input/output interfaces 111 and 112 (i.e., the first input/output interface 111 and the second input/output interface 112) sharing the at least one first signal contact pin P11 is two as an example in the description below.

The second control unit 210 has an input/output interface 211 (i.e., a third input/output interface 211), and the third input/output interface 211 corresponds to the first input/output interface 111. The third control unit 220 has an input/output interface 221 (i.e., a fourth input/output interface 221), and the fourth input/output interface 221 corresponds to the second input/output interface 112. The input/output interfaces 211 and 221 share at least one second signal contact pin P21. In other words, each of the input/output interfaces 211 and 221 is coupled to the second multiplexer 230 through one bus 240, and the second multiplexer 230 is further coupled to the at least one second signal contact pin P21. The selection circuit 251 is coupled to the second power supply contact pin P23. The number of the buses 240 is substantially the same as the number of the input/output interfaces 211 and 221, and the number of the at least one first signal contact pin P11 shared by the input/output interfaces 111 and 112 is substantially the same as the number of the at least one second signal contact pin P21 shared by the input/output interfaces 211 and 221.

In some embodiments, the communication protocol adopted by the third input/output interface 211 is the same as the communication protocol adopted by the first input/output interface 111, and the communication protocol adopted by the fourth input/output interface 221 is the same as the communication protocol adopted by the second input/output interface 112.

The multiple buses 240 may include a third bus 241 and a fourth 242. One terminal of the third bus 241 is coupled to the third input/output interface 211, and the other terminal of the third bus 241 is coupled to the first terminal of the second multiplexer 230. One terminal of the fourth bus 242 is coupled to the fourth input/output interface 221, and the other terminal of the fourth bus 242 is coupled to the second terminal of the second multiplexer 230. The third terminal of the second multiplexer 230 is coupled to the at least one second signal contact pin P21. Herein, the second multiplexer 230 may be directly controlled by the third control unit 220, that is, the third control unit 220 is further coupled to the control terminal of the second multiplexer 230.

When the first electronic device 10 and the second electronic device 20 are assembled together, the second power supply contact pin P23 is connected to the first power supply contact pi P13, and the at least one second signal contact pin P21 is connected to the at least one first signal contact pin P11.

At this point, the selection circuit 251 outputs the supply voltage Vp based on an operating voltage Vdd or a shutdown voltage Vbt to the second power supply contact pin P23. The third control unit 220 outputs a control signal Sc2 to the second multiplexer 230 according to the system status. The second multiplexer 230 selects and connects one between the third bus 241 and the fourth bus 242 to the at least one second signal contact pin P21 based on the control signal Sc2. Herein, the operating voltage Vdd is greater than the shutdown voltage Vbt, and the threshold Vt is between the operating voltage Vdd and the shutdown voltage Vbt.

In some embodiments, the number of the at least one second signal contact pin P21 may be one or more. In other words, the number of the input/output interfaces 211 and 221 may be one or more. In other words, each of the input/output interfaces 211 and 221 may have a certain number of pins to share a certain number of second signal contact pins P21 through the second multiplexer 230. That is, the two communication protocols adopted by the input/output interfaces 211 and 221 may individually have certain numbers of defined signals that share a certain number of second signal contact pins P21 through the second multiplexer 230. Similarly, the third bus 241 coupled with the input/output interface 211 may have a certain number of transmission wires W21a and W21b and the fourth bus 242 coupled with the fourth input/output interface 211 may have a certain number of transmission wires W22a and W22b to be electrically connected to a certain number of second signal contact pins P21 through the second multiplexer 230. The certain number may be one, two, three, four or more. In one embodiment, the input/output interfaces 211 and 221 may share by part of the pins thereof the at least one second signal contact pin P21. In another embodiment, the input/output interfaces 211 and 212 may share by all the pins thereof the at least one second signal contact pin P21. In another example, between the input/output interfaces 211 and 212, all the pins of one and part of the pins of the other share the at least one second signal contact pin P21.

For example, assume that the number of the at least one first signal contact pin P11 is two (i.e., the first signal contact pins P11a and P11b), and the number of the at least one second signal contact pin P21 is also two (i.e., two second signal contact pins P21a and P21b).

The system status of the second electronic device 20 includes a normal state (e.g., the second electronic device 20 has completed the boot procedure and entered the system, i.e., the second control unit of 210 of the second electronic device 20 is operating normally) and a stopped state (e.g., the second electronic device 20 is in a period in which the second control unit 20 is not yet operating normally, such as currently executing a boot procedure or standing-by). Further, the first electronic device 10 and the second electronic device 20 are assembled together, that is, the second power supply contact pin P23 is connected to the first power supply contact pin P13, and the first signal contact pins P11a and P11b are respectively connected to the second signal contact pins P21a and P21b.

In the stopped state, the operating voltage Vdd of the second electronic device 20 is not supplied normally. At this point, the selection circuit 251 receives the shutdown voltage Vbt but does not receive the operating voltage Vdd, and uses the shutdown voltage Vbt as the supply voltage Vp (i.e., the supply voltage Vp is substantially the shutdown voltage Vbt) that is then outputted to the first electronic device 10 through the second power supply contact pin P23. At this point, the comparison circuit 150 receives the supply voltage Vp through the first power supply contact pin P13, compares the supply voltage Vp with the threshold Vt, and generates, as the supply voltage Vp substantially is the shutdown voltage Vbt, a comparison result Sc1 corresponding to the supply voltage Vp being smaller than the threshold Vt to the first multiplexer 130. In response to the comparison result Sc1, the first multiplexer 130 connects the multiple transmission wires W12a and W12b of the second bus 142 respectively to the first signal contact pins P11a and P11b, and disconnects the multiple transmission wires W11a and W11b of the first bus 141 from the first signal contact pins P11a and P11b, as shown in FIG. 3.

Moreover, the third control unit 220 outputs, as the system status is the stopped state, a control signal Sc2 in the first state to the second multiplexer 230, so that the second multiplexer 230 connects the fourth bus 242 to the at least one second signal contact pin P21 in response to the control signal Sc2, that is, connecting the multiple transmission wires W22a and W22b of the fourth bus 242 to the second signal contact pins P21a and P21b, respectively, as shown in FIG. 3. In other words, the second multiplexer 230 disconnects the third bus 241 from the at least one second signal contact pin P21, i.e., disconnecting the multiple transmission wires W21a and W21b of the third bus 241 from the second signal contact pins P21a and P21b, as shown in FIG. 3.

Thus, the third control unit 220 of the second electronic device 20 and the first control unit 110 of the first electronic device 10 communicate with each other through the second signal contact pins P21a and P21b and the first signal contact pins P11a and P11b.

In the normal state, the operating voltage Vdd of the second electronic device 20 is supplied normally. At this point, the selection circuit 251 receives the operating voltage Vdd, and uses and outputs the operating voltage Vdd as the supply voltage Vp (i.e., the supply voltage Vp is substantially the operating voltage Vdd) to the first electronic device 10 through the second power supply contact pin P23. At this point, the comparison circuit 150 receives the supply voltage Vp through the first power supply contact pin P13, compares the supply voltage Vp with the threshold Vt, and generates, as the supply voltage Vp is substantially the operating voltage Vdd, the comparison result Sc1 corresponding to the supply voltage Vp being substantially greater than the threshold Vt to the first multiplexer 130. In response to the comparison result Sc1, the first multiplexer 130 connects the multiple transmission wires W11a and W11b of the first bus 141 to the first signal contact pins P11a and P11b, respectively, and disconnects the multiple transmission wires W12a and W12b of the second bus 142 from the first signal contact pins P11a and P11b, as shown in FIG. 4.

Moreover, the third control unit 220 outputs, as the system status is the normal state, the control signal Sc2 in the second state to the second multiplexer 230, so that the second multiplexer 230 connects the third bus 241 to the at least one second signal contact pin P21 in response to the control signal Sc2, i.e., connecting the multiple transmission wires W21a and W21b of the third bus 241 to the second signal contact pins P21a and P21b, respectively, as shown in FIG. 4. In other words, the second multiplexer 230 disconnects the fourth bus 242 from the at least one second signal contact pin P21, i.e., disconnecting the multiple transmission wires W22a and W22b of the fourth bus 242 from the second signal contact pins P21a and P21b, as shown in FIG. 4.

Thus, the second control unit 210 of the second electronic device 20 and the first control unit 110 of the first electronic device 10 communicate with each other through the second signal contact pins P21a and P21b and the first signal contact pins P11a and P11b.

The first state and the second state of the control signal Sc2 may be a high level and a low level, respectively.

It should be understood that, although the input/output interfaces 221 and 221 located on different control units are given in the description of the foregoing embodiment, such configuration is not a limitation to the present invention. In other words, according to actual requirements, the input/output interfaces 221 and 221 may also be included in the same control unit (not shown).

Figure 7:
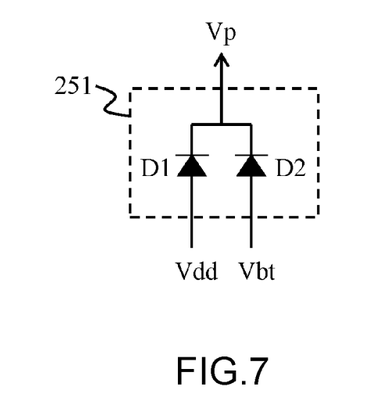
FIG. 7 is a circuit schematic diagram of an example of a selection circuit in FIG. 3 and FIG. 4.

In one embodiment, referring to FIG. 3, FIG. 4 and FIG. 7, the selection circuit 251 includes two diodes D1 and D2. The cathodes of the diodes D1 and D2 are coupled to the second power supply contact pin P23. The anode of the diode D1 is coupled to the operating voltage Vdd, and the anode of the diode D2 is coupled to the shutdown voltage Vbt.

In the stopped state, the operating voltage Vdd of the second electronic device 20 is not supply normally. At this point, only the diode D2 receives the shutdown voltage Vbt, and the diode D1 does not receive the operating voltage Vdd. Herein, the terminal voltage of the anode (i.e., the shutdown voltage Vbt) of the diode D2 is greater than the terminal voltage of the cathode thereof (i.e., the supply voltage Vp, which is approximately 0), so that the diode D2 is turned on since the forward voltage difference between the two terminals thereof is greater than the threshold voltage of the diode D2. Once the diode D2 is turned on, the terminal voltage of the cathode of the diode D2 rises to be substantially equal to the terminal voltage of the anode of the diode D2, that is, the supply voltage Vp is substantially equal to the shutdown voltage Vbt. Because the diode D1 does not receive the operating voltage Vdd, the terminal voltage of the anode of the diode D1 is not greater than the terminal voltage of the cathode thereof, so that the diode D1 is not turned on since the forward voltage difference between the two terminals thereof is smaller than the threshold voltage of the diode D1.

In the normal state, the operating voltage Vdd of the second electronic device 20 is supplied normally. At this point, the diode D1 receives the operating voltage Vdd, and the diode D2 receives the shutdown voltage Vbt. Herein, the terminal voltage of the anode (i.e., the operating voltage) of the diode D1 is greater than the terminal voltage of the cathode thereof (i.e., the supply voltage Vp, which is approximately 0), so that the diode D1 is turned on since that the forward voltage difference between the two terminals thereof is greater than the threshold voltage of the diode D1. Once the diode D1 is turned on, the terminal voltage of the cathode of the diode D1 rises to be substantially equal to the terminal voltage of the anode of the diode D1, that is, the supply voltage Vp is substantially equal to the operating voltage Vdd. At this point, the terminal voltage of the anode (i.e., the shutdown voltage Vbt) of the diode D2 is smaller than the terminal voltage of the cathode thereof (i.e., the supply voltage Vp, which is substantially equal to the operating voltage Vdd), so that the diode D2 is not turned on since the forward voltage difference between the two terminals thereof is not greater than the threshold voltage of the diode D2.

In some embodiments, referring to FIG. 3, FIG. 4, FIG. 8 and FIG. 9, the selection circuit 251 includes a switch SW. The first terminal of the switch SW is coupled to the second power supply contact pin P23, the second terminal of the switch SW is coupled to the operating voltage Vdd, and the third terminal of the switch SW is coupled to the shutdown voltage Vbt. Herein, the switch SW may be also be controlled by the third control unit 220, that is, the control terminal of the switch SW is coupled to the third control unit 220.

Figure 8:
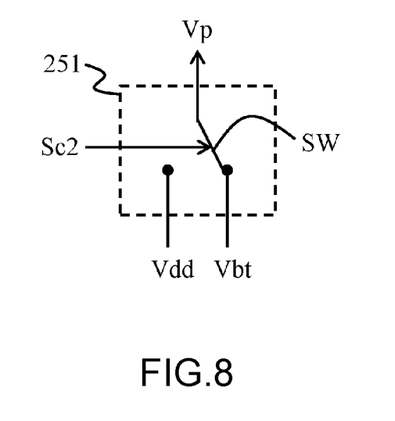
FIG. 8 is a circuit schematic diagram of an example of a selection circuit in FIG. 3.

In the stopped state, the switch SW connects the first terminal to the third terminal and disconnects the first terminal from the second terminal in response to the control signal Sc2 in the first state. Thus, the switch SW provides the supply voltage Vp substantially equal to the shutdown voltage Vbt to the second power supply contact in P23, as shown in FIG. 8.

Figure 9:
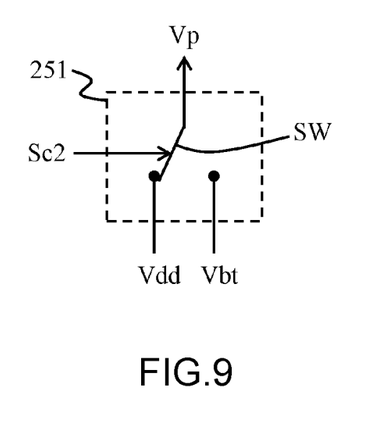
FIG. 9 is a circuit schematic diagram of an example of a selection circuit in FIG. 4.

In the normal state, the switch SW connects the first terminal to the second terminal and disconnects the first terminal from the third terminal in response to the control signal Sc2 in the second state. Thus, the switch SW provides the supply voltage Vp substantially equal to the operating voltage Vdd to the second power supply contact pin P23, as shown in FIG. 9.

Figure 10:
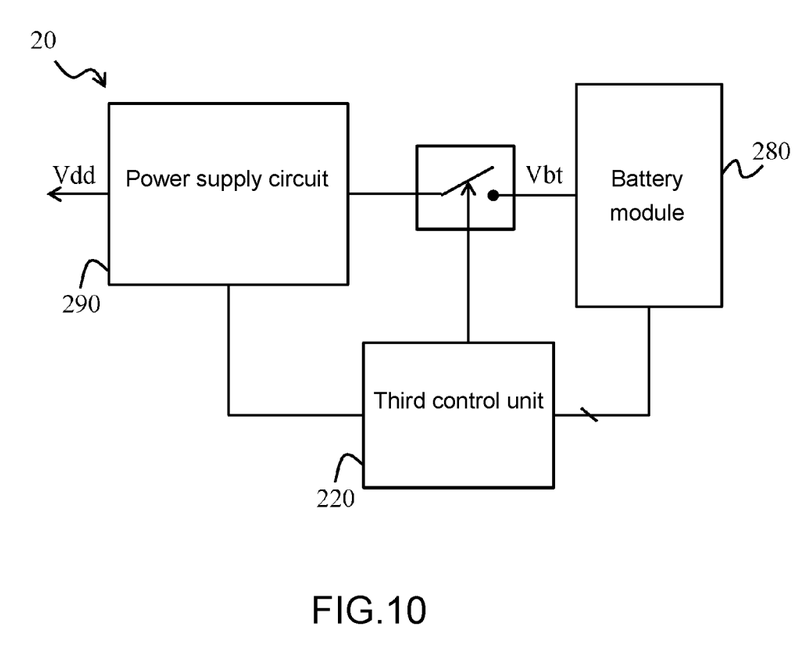
FIG. 10 is a partial schematic diagram of an example of a second electronic device.

In some embodiments, referring to FIG. 3, FIG. 4 and FIG. 10, the second electronic device 20 may further include a battery module 280 and a power supply circuit 290. The battery module 280 is coupled to the power supply circuit 290 through the switch circuit, and provides the shutdown voltage Vbt to the power supply circuit 290 through the switch circuit. The power supply circuit 290 can generate the operating voltage Vdd according to the shutdown voltage Vbt. The power supply circuit 290 and the switch circuit are controlled by the third control unit 220. Herein, the two input terminals of the selection circuit 251 are respectively coupled to the output terminal of the battery module 280 and the output terminal of the power supply circuit 290 so respectively receive the operating voltage Vdd and the shutdown voltage Vbt.

In some embodiments, the second control unit 210 is further coupled to the third control unit 220. In one example, the second control unit 210 further includes another input/output interface (to be referred to as a fifth input/output interface, not shown). The third control unit 220 further includes another input/output interface (to be referred to as a sixth input/output interface, not shown). The fifth input/output interface of the second control unit 210 and the sixth input/output interface of the third control unit 220 are mutually coupled through the bus 243.

In some embodiments, the second electronic device 20 may be a tablet computer, and the first electronic device 10 is an accessory device of the tablet computer. Herein, the first electronic device 10 may further include a main functional circuit 170 implementing the main functional operation of the accessory device. The main functional circuit 170 is coupled to the first control unit 110, and is controlled by the first control unit 110.

In some embodiments, the first electronic device 10 may further include a status indication circuit 180, and the status indication circuit 180 can be configured to indicate the statuses of individual functions of the second electronic device 20 connected thereto. In some embodiments, the status indication circuit 180 includes one or more indication lamps, each of which corresponding to one function (e.g., power, wireless network, remaining battery capacity, number lock, and caps lock). In some embodiments, the indication lamps may indicate by means of being illuminated or extinguished whether the corresponding functions are enabled or disabled. The indication lamps may be light-emitting diodes.

For example, take the second electronic device 20 as a tablet computer and the first electronic device 10 as a combination of a keyboard and a touchpad for instance. The first electronic device 10 includes a first embedded controller (i.e., the first control unit 110), which has a USB interface (i.e., the first input/output interface 111) and an I²C interface (i.e., the second input/output interface 111). The second electronic device 20 includes a central processor (i.e., the second control unit 210) and a second embedded controller (i.e., the third control unit 220), wherein the central processor has a USB interface (i.e., the third input/output interface 211) and the second embedded controller has an I²C interface (i.e., the fourth input/output interface 221). The shutdown voltage Vbt of the tablet computer is about 3.0 V to 4.2 V, and the operating voltage Vdd of the tablet computer is 5 V.

Herein, the pin of the USB interface for transmitting positive data D+ and the pin of the I²C interface for transmitting clock CK share one signal contact pin P11a/P21a, and the pin of the USB interface for transmitting positive data D− and the pin of the I²C interface for transmitting data DA share anothersignal contact pin P11b/P21b.

When the tablet computer is not yet booted or is in standby, the second embedded controller causes the second multiplexer 230 to connect the I²C interface of the second embedded controller to the second signal contact pin P21. At this point, the source of the supply voltage Vp is the shutdown voltage Vbt, so that the first multiplexer 130 connects the I²C interface of the first embedded controller to the first signal contact pin P11. Thus, the second embedded controller of the tablet computer sends by the I²C interface a status display command to the I²C interface of the first embedded controller, so that the first embedded controller controls the status indication circuit 180 to indicate the corresponding status according to the status display command.

When the tablet computer has been booted and operates normally, the second embedded controller causes the second multiplexer 230 to connect the USB interface of the central processor to the second signal contact pin P21. At this point, the source of the supply voltage Vp is the operating voltage Vdd, so that the first multiplexer 130 connects the USB interface of the first embedded controller to the first signal contact pin P11. Thus, the central processor of the tablet computer sends a get/set feature command by the USB interface to the USB interface of the first embedded controller, so that the first embedded controller controls the status indication circuit 180 to indicate the corresponding status according to the get/set feature command.

In some embodiments, referring to FIG. 5 and FIG. 6, the second electronic device 20 may configure a voltage dividing circuit according to the communication protocol used, so as to output the supply voltage Vp in a corresponding voltage value to the first electronic device 10.

In another embodiment, the second electronic device 20 may include a second control circuit, a multiplexer (to be referred to as a second multiplexer 230), at least one signal contact pin (to be referred to as a second signal contact pin P21, e.g., P21a and P21b), a power supply contact pin (to be referred to as a second power supply contact pin P23) and a voltage dividing circuit 253. The second control circuit includes a control unit (to be referred to as a second control unit 210'). The number of the input/output interfaces 111 and 112 (i.e., the first input/output interface 111 and the second input/output interface 112) sharing the at least one first signal contact pin P11 is two as an example in the description below.

The second control unit 210' has an input/output interface 212 (i.e., the third input/output interface 212). The third input/output interface 212 is coupled to the at least one second signal contact pin P21 through a bus (to be referred to as a third bus 244). For example, taking the at least one second signal contact pin P21 including two second signal contact pins P21a and P21b for instance, a transmission wire W31a of the third bus 244 is coupled between the third input/output interface 212 and the second signal contact pin P21a, and a transmission wire W31b of the third bus 244 is coupled between the third input/output interface 212 and the second signal contact pin P21b.

The input terminal of the voltage dividing circuit 253 is coupled to the operating voltage Vdd, and the output terminal of the voltage dividing circuit 253 is coupled to the second power supply contact pin P23. Herein, the communication protocol adopted by the input/output interface 212 is the same as the communication protocol adopted by one between the input/output interfaces 111 and 112. The voltage dividing circuit 253 divides the operating voltage Vdd so as to provide the supply voltage Vp corresponding to the communication protocol adopted by the third input/output interface 212 to the second power supply contact pin P23.

For example, assume that the number of the input/output interfaces 111 and 112 is two (i.e., the first input/output interface 111 and the second input/output interface 112). When the supply voltage Vp is greater than the threshold Vt, the first multiplexer 130 connects the first bus 141 to the at least one first signal contact pin P11; conversely, when the supply voltage Vp is not greater than the threshold Vt, the first multiplexer 130 connects the second bus 142 to the at least one first signal contact pin P11.

For the second electronic device 20 having the third input/output interface 212 adopting the same communication protocol as the first input/output interface 111, the voltage dividing circuit 253 divides the operating voltage Vdd to generate the supply voltage Vp greater than the threshold Vt. Once the first electronic device 10 and the second electronic device 20 are assembled together, the supply voltage Vp greater than the threshold Vt is outputted to the first electronic device 10 through the second power supply contact pin P23, so that the first multiplexer 130 connects the first bus 141 to the at least one first signal contact pin P11. Thus, the first control unit 110 of the first electronic device 10 is allowed to communicate with the second control unit 210' of the second electronic device 20 through the first input/output interface 111, as shown in FIG. 5.

For the second electronic device 20 having the third input/output interface 212 adopting the same communication protocol as the second input/output interface 112, the voltage dividing circuit 253 divides the operating voltage Vdd to generate the supply voltage Vp not greater than (or smaller than) the threshold Vt. Once the first electronic device 10 and the second electronic device 20 are assembled together, the supply voltage Vp not greater than (or smaller than) the threshold Vt is outputted to the first electronic device 10 through the second power supply contact pin P23, so that the first multiplexer 130 connects the second bus 142 to the at least one first signal contact pin P11. Thus, the first control unit 110 of the first electronic device 10 is allowed to communicate with the second control unit 210' of the second electronic device 20 through the second input/output interface 112, as shown in FIG. 5.

Figure 11:
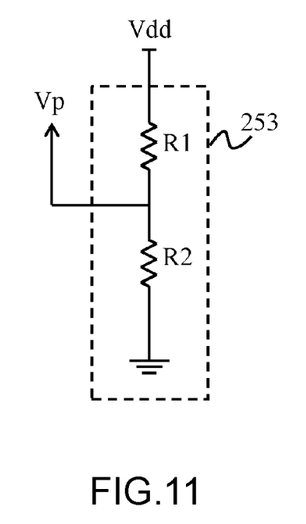
FIG. 11 is a circuit schematic diagram of a voltage dividing circuit in FIG. 5 and FIG. 6.

In some embodiments, referring to FIG. 5, FIG. 6 and FIG. 11, the voltage dividing circuit 253 includes multiple resistors R1 and R2. The resistor R1 and R2 are connected in series between the operating voltage Vdd and ground. A contact point between the resistors R1 and R2 is coupled to the second power supply contact pin P23.

In some embodiments, referring to FIG. 5, FIG. 6, FIG. 10 and FIG. 11, on terminal of the resistor R1 may be coupled to the output terminal of the power supply circuit 290 to receive the operating voltage Vdd. The other terminal of the resistor R1 may be coupled to one terminal of the resistor R2 and the second power supply contact pin P23, and the other terminal of the resistor R2 is coupled to ground.

In some embodiments, the first electronic device 10 may be a tablet computer, and the second electronic device 20 may be an accessory device of the tablet computer. Herein, the second electronic device 20 may further include a main functional circuit 270 implementing a main functional operation of the accessory device. The main functional circuit 270 is coupled to the second control unit 210', and is controlled by the second control unit 210'.

For example, assume that the first electronic device 10 is a tablet computer. The tablet computer includes a central processor (i.e., the first control unit 110), and the central processor has a USB interface (i.e., the first input/output interface 111) and DP interface (i.e., the second input/output interface 112). Herein, the pin of the USB interface for transmitting positive data D+ and the pin of the DP interface for transmitting a real signal CHp of an auxiliary channel (AUX) share one first signal contact pin P11a, and the pin of the USB interface for transmitting negative data D− and the pin of the DP interface for transmitting the auxiliary signal CHn of the auxiliary channel share the other first signal contact pin P11b. The operating voltage Vdd of the tablet computer is 5V, and the threshold Vt is 3V.

In one example, the second electronic device 20 is a keyboard. The keyboard includes a second central processor (i.e., the second control unit 210), and the second central processor has a USB interface (i.e., the third input/output interface 211). Herein, the voltage dividing circuit 253 divides the operating voltage Vdd to generate a 4V supply voltage Vp.

Once the tablet computer and the keyboard are assembled together, the comparison circuit 150 receives the 4V supply voltage Vp through the first power supply contact pin P13, so as to drive the first multiplexer 130 to connect the first bus 141 to the first signal contact pins P11a and P11b. Thus, the first central processor of the tablet computer and the second central processor of the keyboard can communicate with each other.

In another example, the second electronic device 20 is a display screen. The display screen includes a microprocessor (i.e., the second control unit 210), and the microcontroller has a DP interface (i.e., the third input/output interface 211). Herein, the voltage dividing circuit 253 divides the operating voltage Vdd to generate a 2V supply voltage.

Once the tablet computer and the display are assembled together, the comparison circuit 150 receives the 2V supply voltage Vp through the first power supply contact pin P13, so as to drive the first multiplexer 130 to connect the second bus 142 to the first signal contact pins P11a and P11b. Thus, the first central processor of the tablet computer and the microprocessor of the display screen can communicate with each other.

Figure 12:
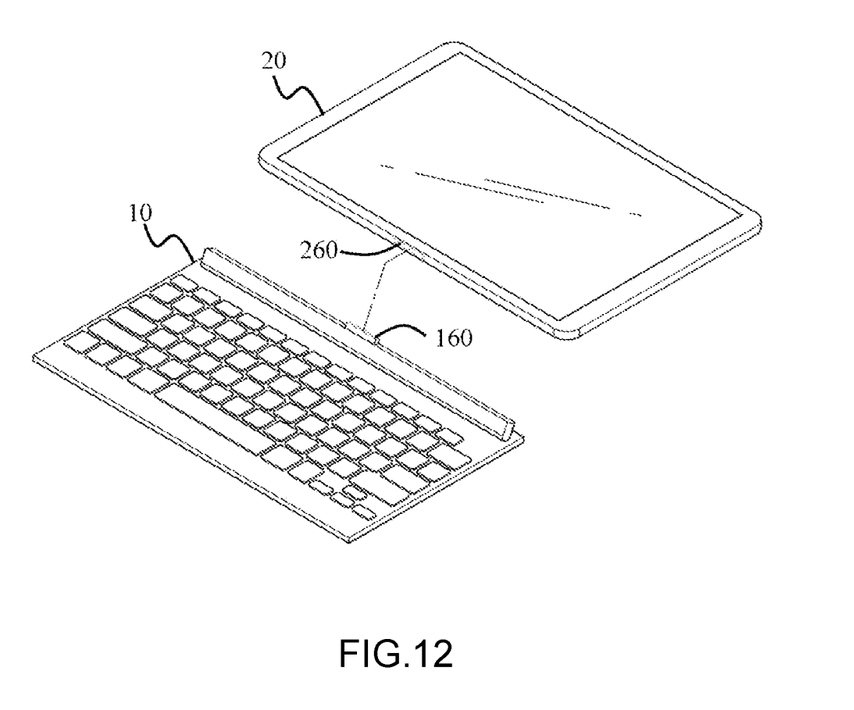
FIG. 12 is an exploded schematic diagram of an example of an electronic apparatus in FIG. 5 and FIG. 6.

In some embodiments, the first power supply contact pin P13 and the at least one first signal contact pin P11 (i.e., both the first signal contact pins P11a and P11b) are implemented by one single connector 160. At this point, the second power supply contact pin P23 and the at least one second signal contact pin P21 (i.e., both the second signal contact pins P21a and P21b) are implemented by one single connector 260. Further, the connectors 160 and 260 match each other, and are for example, a plug connector and a receptacle connector. Thus, the first electronic device 10 and the second electronic device 20 are assembled together by connecting the connectors 160 and 260. For example, referring to FIG. 3, FIG. 4 and FIG. 12, assume that the second electronic device 20 is a tablet computer, and the first electronic device 10 is an accessory device of the tablet computer. The connector 260 of the tablet computer and the connector 160 of the accessory device are connected to assemble the tablet computer and the accessory device together. The connector 160 of the accessory device has a predetermined number of contact pins, and the first power supply contact pin P13 and the two first signal contact pins P11a and P11b are three among the predetermined number of contact pins of the connector 160. The connector 260 of the tablet computer also has a predetermined number of contact pins, and the second power supply contact pin P23 and the two second signal contact pins P21a and P21b are three among the predetermined number of contact pins of the connector 260.

In some embodiments, each of the control units (.e.g., the first control unit 110, the second control unit 210, the third control unit 220 and the second control unit 210') may be a microprocessor, a microcontroller, a digital signal processor, a central processor, a programmable logic controller, a state machine or any analog and/or digital device based on an operation instruction or an operating signal.

In some embodiments, the first control unit 110 may be implemented by an integrated circuit (IC). In some embodiments, the second control unit 210 may be implemented by an IC, and the third control unit 220 may be implemented by another IC. In some embodiments, the second control unit 210 and the third control unit 220 may also be implemented by the same IC. In some embodiments, the second control unit 210' may be implemented by one or more ICs.

In some embodiments, each of the multiplexer (i.e., the first multiplexer 130 and the second multiplexer 230) may be implemented by one or more switches, wherein each switch may be implemented by one or more transistors.

In a first example, when the accessory device is a charging dock, the main functional circuit 170/270 may be a charging circuit, which is adapted to charge the tablet computer connected thereto. In a second example, when the accessory device is a keyboard, the main functional circuit 170/270 may be a key sensing circuit or a key triggering circuit, which is adapted to generate a key signal to the tablet computer connected. In a third example, when the accessory device is a touchpad, the main functional circuit 170/270 may be a touch sensing circuit, which is adapted to generate a sensing signal corresponding to a touch operation to the tablet computer connected. In a fourth example, when the accessory device is a display screen, the main functional circuit 170/270 may be a display panel, which is adapted to display an image according to a display signal sent from the tablet computer connected thereto. In a fifth example, when the accessory device is a projection device, the main functional circuit 170/270 may be a protection circuit, which is adapted to project an image according to a display signal sent from the tablet computer connected thereto. In a sixth example, when the accessory device is a speaker, the main functional circuit 170/270 may be an audio output circuit, which is adapted to play a sound according to an audio signal sent from the tablet computer connected. In a seventh example, when the accessory device is an optical disc drive, the main functional circuit 170/270 may be a reading circuit, which is adapted to read data recorded in an optical disc according to a read signal sent from the tablet computer connected thereto. In an eighth example, when the accessory device is a digital drawing pad, the main functional circuit 170/270 may be a sensing circuit, which is adapted to sense a drawing operation and to generate an input signal corresponding to the drawing operation to the tablet computer connected thereto. In a ninth example, when the accessory device is a hard drive, the main functional circuit 170/270 may be an access circuit and a memory, wherein the access circuit is adapted to access data stored in the memory according to an access signal sent from the tablet computer connected thereto.

In some embodiments, the battery module 280 may include a gauge IC and one or more battery cells. The gauge IC is coupled to the battery cell(s) and the third control unit 220. The gauge IC records information of the battery module 280, estimates various states of the battery module 280, and detects the voltage of the battery cell(s) to estimate a charge status of the battery module 280. The battery cell(s) is/are coupled to the power supply circuit 290 through the switch circuit, and provide(s) the shutdown voltage Vbt to the power supply circuit 290 through the switch circuit.

In conclusion of the above, the electronic apparatus and the signal switching method according to any one of the embodiments are capable of switching, according to the external supply power Vp, the input/output interface 111/112 used by the first control unit 110, so that the first electronic device 10 and the second electronic device 20 can be connected using a minimal number of pins, and that the second electronic device 20 in a stopped state (e.g., being in a period in which the second control unit 210 does not operate normally such as currently executing a boot procedure or standing-by) is allowed to communicate with the first electronic device 10 connected thereto.

What is claimed is:

1. An electronic apparatus, comprising:
    a first electronic device, comprising:
        a first power supply contact pin, receiving a supply voltage from outside of the first electronic device;
        at least one first signal contact pin;
        a comparison circuit, comparing the supply voltage with a threshold to accordingly generate a comparison result;
        a first control circuit, having a first input/output interface and a second input/output interface;
        a first bus, one terminal of the first bus being coupled to the first input/output interface;
        a second bus, one terminal of the second bus being coupled to the second input/output interface; and
        a first multiplexer, coupled to the at least one first signal contact pin, one other terminal of the first bus and one other terminal of the second bus, the first multiplexer:
            disconnecting the second bus from the at least one first signal contact pin and connecting the first bus to the at least one first signal contact pin in response to the comparison result having a first characteristic; and
            disconnecting the first bus from the at least one first signal contact pin and connecting the second bus to the at least one first signal contact pin in response to the comparison result having a second characteristic different than the first characteristic; and
    a second electronic device, the second electronic device comprising:
        a second power supply contact pin, connected to the first power supply contact pin, outputting the supply voltage;
        at least one second signal contact pin, connected to the at least one first signal contact pin;
        a selection circuit, outputting the supply voltage based on an operating voltage or a shutdown voltage to the second power supply contact pin;
        a second control circuit, outputting a control signal according to a system status, the second control circuit having a third input/output interface and a fourth input/output interface;
        a third bus, one terminal of the third bus being coupled to the third input/output interface;
        a fourth bus, one terminal of the fourth bus being coupled to the fourth input/output interface; and
        a second multiplexer, coupled to the at least one second signal contact pin, one other terminal of the third bus and one other terminal of the fourth bus, the second multiplexer selecting and connecting one between the third bus and the fourth bus to the at least one second signal contact pin based on the control signal.

2. The electronic apparatus according to claim 1, wherein the first bus and the second bus support different communication protocols.

3. The electronic apparatus according to claim 1, wherein the first power supply contact pin and the at least one first signal contact pin are implemented by one single connector.

4. The electronic apparatus according to claim 1, wherein in response to the supply voltage being in a first voltage value, resulting in the comparison result having the first characteristic, the first multiplexer connects the first bus to the at least one first signal contact pin.

5. The electronic apparatus according to claim 1, wherein the second electronic device is a tablet computer, and the first electronic device is an accessory device of the tablet computer.

6. The electronic apparatus according to claim 1, wherein the selection circuit comprises a first current limiting unit and a second current limiting unit, one terminal of the first current limiting unit is coupled to the operating voltage, one terminal of the second current limiting unit is coupled to the shutdown voltage, and one other terminal of the first current limiting unit and one other terminal of the second current limiting unit are coupled to the second power supply contact pin.

7. The electronic apparatus according to claim 1, wherein the selection circuit is a third multiplexer.

8. The electronic apparatus of claim 1, wherein the comparison circuit comprises a comparator having a first terminal connected to the supply voltage and a second terminal connected with a voltage source supplying the threshold.

* * * * *